United States Patent
Azar et al.

(10) Patent No.: US 7,899,230 B2
(45) Date of Patent: Mar. 1, 2011

(54) SYSTEM AND METHOD FOR EFFICIENT REAL-TIME TECHNIQUE FOR POINT LOCALIZATION IN AND OUT OF A TETRAHEDRAL MESH

(75) Inventors: Fred S. Azar, Princeton, NJ (US); Benoit de Roquemaurel, Versailles (FR)

(73) Assignee: Siemens Aktiengesellschaft, München (*) Notice: Subject to any disclaimer, the term of this patent is extended or adjusted under 35 U.S.C. 154(b) by 731 days.

(21) Appl. No.: 11/960,867

(22) Filed: Dec. 20, 2007

(65) Prior Publication Data

US 2008/0205720 A1    Aug. 28, 2008

Related U.S. Application Data

(60) Provisional application No. 60/883,833, filed on Jan. 8, 2007.

(51) Int. Cl.
*G06K 9/00* (2006.01)

(52) U.S. Cl. ......... 382/128; 382/154; 382/199; 382/241; 382/131; 382/285; 345/419; 345/420; 345/428; 345/423

(58) Field of Classification Search ......... 382/128, 382/154, 241, 199, 181; 345/419, 425, 420, 345/428, 421
See application file for complete search history.

(56) References Cited

U.S. PATENT DOCUMENTS

| 5,647,018 | A | * | 7/1997 | Benjamin | 382/128 |
| 7,023,432 | B2 | * | 4/2006 | Fletcher et al. | 345/419 |
| 7,526,131 | B2 | * | 4/2009 | Weber | 382/199 |
| 2003/0067461 | A1 | * | 4/2003 | Fletcher et al. | 345/420 |

OTHER PUBLICATIONS

Sunil Arya, et al., "An Optimal Algorithm for Aproximate Nearest Neighbor Searching in Fixed Dimensions," pp. 891-923, Journal of the ACM, vol. 45, No. 6 Nov. 1998.

* cited by examiner

*Primary Examiner* — Wes Tucker
*Assistant Examiner* — Nancy Bitar
(74) *Attorney, Agent, or Firm* — Donald B. Paschburg; F. Chau & Associates, LLC (57) ABSTRACT

A method for determining whether a point is contained in a sub-volume of a digitized medical image, includes providing a tetrahedron volume mesh (TVM) representing a sub-volume of a digital image volume and a point M, finding a vertex P of said TVM that is closest to point M, finding a tetrahedron $T_i$ in said TVM that defines a solid angle around point P where point M is located, wherein if M is inside $T_i$, then M is inside the TVM, if M is not inside $T_i$, finding a facet F of tetrahedron $T_i$ through which a line PM connecting points M and P exits $T_i$, and determining whether a next tetrahedron $T_{i+1}$ of said TVM exists along line PM, wherein if no such tetrahedron $T_{i+1}$ exists, then point M is outside the TVM, and wherein if $T_{i+1}$ exists, determining whether point M is inside tetrahedron $T_{i+1}$.

27 Claims, 6 Drawing Sheets

SYSTEM AND METHOD FOR EFFICIENT REAL-TIME TECHNIQUE FOR POINT LOCALIZATION IN AND OUT OF A TETRAHEDRAL MESH

CROSS REFERENCE TO RELATED UNITED STATES APPLICATIONS

This application claims priority from "Efficient real-time technique for point localization in and out of a tetrahedral mesh", U.S. Provisional Application No. 60/883,833 of Azar, et al., filed Jan. 30, 2007, the contents of which are herein incorporated by reference.

TECHNICAL FIELD

This disclosure is directed to the representation of volumes in digitized medical images.

DISCUSSION OF THE RELATED ART

A common way of representing a digital volume is to use a tetrahedron volume mesh (TVM). A TVM is a set of tetrahedra, where a tetrahedron is a volume defined by connecting 4 non-coplanar points. A TVM is stored as a set of points and 4-tuples, where a 4-tuple is the set of point indices belonging to the four points of a tetrahedron. A facet is a surface triangle of a tetrahedron, and a tetrahedron has four facets. Two tetrahedra can only intersect by an entire edge or facet, and then transitively, as otherwise it could happen that the two tetrahedra have only one vertex in common. The number of points and tetrahedra in a TVM could be useful. A simple operation such as whether or not a point is in a mesh could be time consuming, especially if the operation is repeated.

Let M be a point in 3D space and ABCD a tetrahedron. The necessary criteria for M to be in ABCD is for M to satisfy the following four equations:

$$(\overline{BM} \cdot \overline{N}_A^{ABCD}) \cdot (\overline{BA} \cdot \overline{N}_A^{ABCD}) \geq 0,$$

$$(\overline{CM} \cdot \overline{N}_B^{ABCD}) \cdot (\overline{CB} \cdot \overline{N}_B^{ABCD}) \geq 0,$$

$$(\overline{DM} \cdot \overline{N}_C^{ABCD}) \cdot (\overline{DC} \cdot \overline{N}_C^{ABCD}) \geq 0,$$

$$(\overline{AM} \cdot \overline{N}_D^{ABCD}) \cdot (\overline{AD} \cdot \overline{N}_D^{ABCD}) \geq 0, \quad (1)$$

where $\overline{N}_A^{ABCD}$, $\overline{N}_B^{ABCD}$, $\overline{N}_C^{ABCD}$, and $\overline{N}_D^{ABCD}$ are the normals to the 4 facets of ABCD, and the subscript corresponds to the opposite vertex of the facet.

One algorithm for creating a TVM from a set of points is the Delaunay triangulation algorithm, in which the TVM is created as a set of tetrahedra which discretize the volume of the convex envelope of the set of points. A commonly used tree data structure for organizing 3-dimensional space is the Octree. Each node of an octree represents a cuboid volume, and each node has 8 children, hence the name: oct+tree=octree. An algorithm which computes for a given point in space the nearest point among a set of fixed points using a pre-computed octree is the Nearest Point Algorithm (NPA).

SUMMARY OF THE INVENTION

Exemplary embodiments of the invention as described herein generally include methods and systems for point localization in and out of a tetrahedral mesh. An algorithm according to an embodiment of the invention makes use of a pre-computed octree representation of a volume and a precomputed TVM to determine if a tetrahedron T exists along a line connecting a point M and vertex P of a tetrahedron in the TVM such that tetrahedron T contains M. If no such tetrahedron T exists, then point M is outside of the TVM.

An algorithm according to an embodiment of the invention can be used for detection of contact or collision between a TVM and a point, and for discretization of a TVM in a 3 dimensional volumetric mask. In the medical field, this technique is quite useful since it enables the use of 3D volumetric models of organs created from medical images, and can model the interaction of an organ model with other models, which could be organs, virtual tools, or any other interaction which requires a volumetric modeling. In the non-medical field, this technique is also very useful since any mechanical part of a system can be modeled as a 3D volumetric model/mesh. Then it becomes imperative to understand how this model interacts with its environment using this technique.

According to an aspect of the invention, there is provided a method for determining whether a point is contained in a sub-volume of a digitized medical image, including the steps of providing a digitized image volume, said image volume comprising a plurality of intensities associated with a 3-dimensional grid of voxels, representing a sub-volume of said image with a tetrahedron volume mesh (TVM), providing a point M in said image, finding a vertex P of said TVM that is closest to point M, and determining whether there exists a tetrahedron T in said TVM that defines a solid angle around point P where point M is located, wherein if no such tetrahedron T exists, then point M is outside said TVM, and wherein if T exists and M is inside T, then M is inside said TVM.

According to a further aspect of the invention, if tetrahedron T exists and M is not inside T, the method includes finding a facet F of tetrahedron T through which a line PM connecting points M and P exits T, determining whether a next tetrahedron $T_{i+1}$ of said TVM exists along line PM, wherein if no such tetrahedron $T_{i+1}$ exists, then point M is outside said TVM, and wherein if $T_{i+1}$ exists, determining whether point M is inside tetrahedron $T_{i+1}$.

According to a further aspect of the invention, if point M is inside tetrahedron $T_{i+1}$, then point M is inside said TVM, and if point M is not inside tetrahedron $T_{i+1}$, repeating said steps of finding a facet F of tetrahedron $T_{i+1}$ through which a line PM exits $T_{i+1}$ and determining whether another tetrahedron of said TVM exists along line PM.

According to a further aspect of the invention, determining whether point M is inside tetrahedron $T_{i+1}$, wherein tetrahedron $T_{i+1}$ has vertices A, B, C, D, comprises testing whether the inequalities $$(\overline{BM} \cdot \overline{N}_A^{ABCD}) \cdot (\overline{BA} \cdot \overline{N}_A^{ABCD}) \geq 0,$$

$$(\overline{CM} \cdot \overline{N}_B^{ABCD}) \cdot (\overline{CB} \cdot \overline{N}_B^{ABCD}) \geq 0,$$

$$(\overline{DM} \cdot \overline{N}_C^{ABCD}) \cdot (\overline{DC} \cdot \overline{N}_C^{ABCD}) \geq 0,$$

$$(\overline{AM} \cdot \overline{N}_D^{ABCD}) \cdot (\overline{AD} \cdot \overline{N}_D^{ABCD}) \geq 0,$$

hold true, wherein $\overline{N}_A^{ABCD}$, $\overline{N}_B^{ABCD}$, $\overline{N}_C^{ABCD}$, and $\overline{N}_D^{ABCD}$ are the normal vectors to the four facets of ABCD, and the subscript corresponds to the opposite vertex of the facet.

According to a further aspect of the invention, finding a facet F of tetrahedron T wherein tetrahedron T has vertices A, B, C, P, through which line PM exits T comprises, for a first tetrahedron along line PM, finding facet ABC and the point $H_0$ in ABC through which line PM exits, and for a subsequent tetrahedron $T_i$ along line PM, finding the points of intersection of line PM with the planes containing each of the other facets of tetrahedron T and determining which intersection point is contained within the triangle of a facet of tetrahedron T.

According to a further aspect of the invention, finding the points of intersection of line PM with the planes containing each of the other facets of tetrahedron T comprises calculating $$\overline{OH_i^{B_iC_iD_i}} = \overline{OP} + \frac{\overline{N_{A_i}^{A_iB_iC_iD_i}} \cdot \overline{PA_i}}{\overline{N_{A_i}^{A_iB_iC_iD_i}} \cdot \overline{PM}}\overline{PM},$$

$$\overline{OH_i^{A_iB_iD_i}} = \overline{OP} + \frac{\overline{N_{B_i}^{A_iB_iC_iD_i}} \cdot \overline{PB_i}}{\overline{N_{B_i}^{A_iB_iC_iD_i}} \cdot \overline{PM}}\overline{PM},$$

$$\overline{OH_i^{A_iB_iC_i}} = \overline{OP} + \frac{\overline{N_{C_i}^{A_iB_iC_iD_i}} \cdot \overline{PC_i}}{\overline{N_{C_i}^{A_iB_iC_iD_i}} \cdot \overline{PM}}\overline{PM}.$$

wherein point O is the origin of the coordinate system, $\overline{N_A^{ABCD}}$, $\overline{N_B^{ABCD}}$, $\overline{N_C^{ABCD}}$, and $\overline{N_D^{ABCD}}$ are the normal vectors to the four facets of ABCD and the subscript corresponds to the opposite vertex of the facet, and $H_i^{B_iC_iD_i}$, $H_i^{A_iB_iC_i}$, $H_i^{A_iB_iD_i}$, are the points of intersection with the planes of facets $B_iC_iD_i$, $A_iB_iC_i$, and $A_iB_iD_i$ of tetrahedron $T_i$.

According to a further aspect of the invention, if $\overline{H_{i-1}H_i^{B_iC_iD_i}} \cdot \overline{N_{B_i}^{A_iB_iC_iD_i}} \geq 0$ and $\overline{H_{i-1}H_i^{B_iC_iD_i}} \cdot \overline{N_{C_i}^{A_iB_iC_iD_i}} \geq 0$ then $H_i = H_i^{B_iC_iD_i}$, if $\overline{H_{i-1}H_i^{A_iC_iD_i}} \cdot \overline{N_{A_i}^{A_iB_iC_iD_i}} \geq 0$ and $\overline{H_{i-1}H_i^{B_iC_iD_i}} \cdot \overline{N_{C_i}^{A_iB_iC_iD_i}} \geq 0$ then $H_i = H_i^{A_iC_iD_i}$, or if $\overline{H_{i-1}H_i^{A_iB_iD_i}} \cdot \overline{N_{A_i}^{A_iB_iC_iD_i}} \geq 0$ and $\overline{H_{i-1}H_i^{B_iC_iD_i}} \cdot \overline{N_{B_i}^{A_iB_iC_iD_i}} \geq 0$ then $H_i = H_i^{A_iB_iD_i}$, wherein $H_{i-1}$ is the intersection point of a previous tetrahedron along line PM.

According to a further aspect of the invention, the method includes computing an octree to represent said digital image volume, wherein said vertex P of said TVM that is closest to point M is found by using a nearest point algorithm on said octree.

According to a further aspect of the invention, the method includes computing a list $L_P$ of all tetrahedra of said TVM, computing and storing normal vectors of each of the four facets of each tetrahedron in said list, and computing a table of facets $T_F$ corresponding to each normal vector, searching said list $L_P$ to find said tetrahedron T in said TVM that defines a solid angle around point P in which point M is located, and searching said facet table $T_F$ to find said next tetrahedron $T_{i+1}$ of said TVM along line PM.

According to a further aspect of the invention, the method includes, for a TVM that is not convex, searching said facet table $T_F$ to find facets $T_B$ with no other corresponding facets, computing a convex envelope of the facets $T_B$ and adding facets $T_B$ corresponding to said envelope to said facets $T_B$, computing connected components $C(\tilde{T}_B)$ in $\tilde{T}_B$, and filling each connected component of $C(\tilde{T}_B)$ with a tetrahedron labeled as an outside tetrahedron, wherein tetrahedra of said non-convex TVM are labeled as inside tetrahedra, wherein said TVM is converted to a convex sub-volume.

According to a further aspect of the invention, point M is inside said TVM if said tetrahedron T is an inside tetrahedron.

According to another aspect of the invention, there is provided a method for determining whether a point is contained in a sub-volume of a digitized medical image, including providing a tetrahedron volume mesh (TVM) representing a sub-volume of a digital image volume, and a point M, finding a vertex P of said TVM that is closest to point M, finding a tetrahedron $T_i$ in said TVM that defines a solid angle around point P where point M is located, wherein if M is inside $T_i$, then M is inside said TVM, if M is not inside $T_i$, finding a facet F of tetrahedron $T_i$ through which a line PM connecting points M and P exits $T_i$, and determining whether a next tetrahedron $T_{i+1}$ of said TVM exists along line PM, wherein if no such tetrahedron $T_{i+1}$ exists, then point M is outside said TVM, and wherein if $T_{i+1}$ exists, determining whether point M is inside tetrahedron $T_{i+1}$.

According to a further aspect of the invention, if no such tetrahedron $T_i$ in said TVM exists that defines a solid angle around point P where point M is located, then point M is outside said TVM.

According to another aspect of the invention, there is provided a program storage device readable by a computer, tangibly embodying a program of instructions executable by the computer to perform the method steps for determining whether a point is contained in a sub-volume of a digitized medical image.

DETAILED DESCRIPTION OF EXEMPLARY EMBODIMENTS

Exemplary embodiments of the invention as described herein generally include systems and methods for point localization in and out of a tetrahedral mesh. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

According to an embodiment of the invention, an algorithm is provided that can determine in real-time whether a point is inside a tetrahedral mesh, and if that is the case, to which tetrahedron it belongs. An algorithm according to an embodiment of the invention is adaptable to different types of volumes which may or may not be connected. An algorithm according to an embodiment of the invention is sufficiently robust to deal with tetrahedra that have extreme shapes. An algorithm according to an embodiment of the invention includes some pre-computations to accelerate performance for several queries.

According to an embodiment of the invention, a Nearest Point Algorithm has been adapted to solve the location of a point M in or outside a TVM. Accordingly, some background on the nearest point algorithm will be provided. Nearest neighbor searching is the following problem: given a set S of n data points in a metric space, X, the task is to preprocess these points so that, given any query point q∈X, the data point nearest to q can be reported quickly. It is difficult to obtain algorithms that are efficient in the worst case with respect to both space and query time for dimensions higher than 2. An alternative approach is to find approximate nearest neighbors. Consider a set S of data points in $R^d$ and a query point q∈$R^d$. Given ε>0, a point p∈S is a (1+ε)-approximate nearest neighbor of q if dist(p, q)≦(1+ε)dist(p*, q), where p* is the true nearest neighbor to q. In other words, p is within relative error ε of the true nearest neighbor. More generally, for 1≦k≦n, a $k^{th}$ (1+ε)-approximate nearest neighbor of q is a data point whose relative error from the true $k^{th}$ nearest neighbor of q is ε.

A suitable data structure for nearest neighbor searching is based on a hierarchical decomposition of space, known as a balanced box-decomposition (BBD) tree. This tree has O(log n) height, and subdivides space into regions of O(d) complexity defined by axis-aligned hyperrectangles where the ratio between the longest and shortest sides is bounded. Space is recursively subdivided into a collection of cells, each of which is either a d-dimensional rectangle or the set-theoretic difference of two rectangles, one enclosed within the other. Each node of the tree is associated with a cell, and hence it is implicitly associated with the set of data points lying within this cell. Each leaf cell is associated with a single point lying within the bounding rectangle for the cell. The leaves of the tree define a subdivision of space. The tree has O(n) nodes and can be built in O(dn log n) time. In 3 dimensions, this structure is equivalent to an octree.

Figure 1:
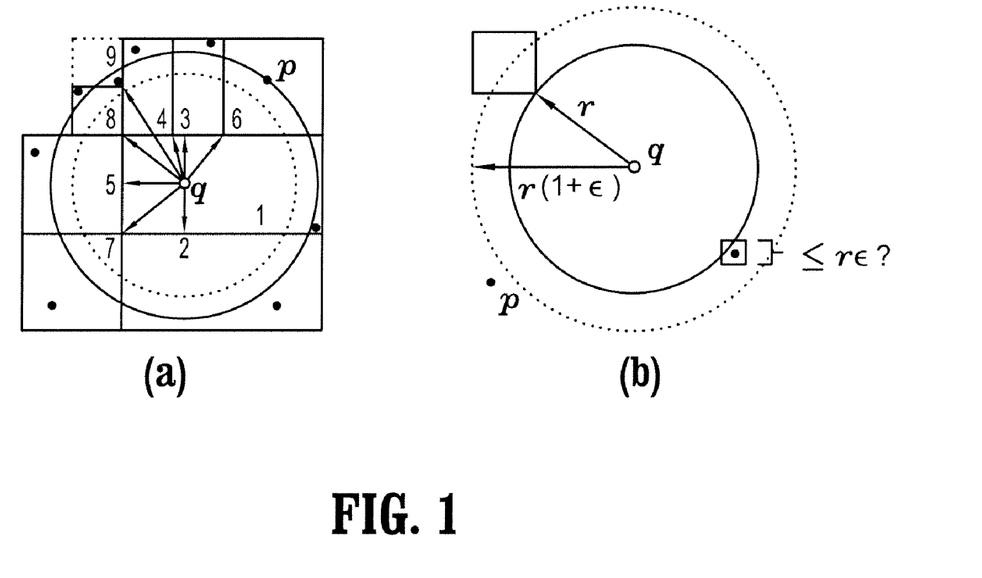
FIGS. 1(a)-(b) illustrate an exemplary nearest point searching algorithm.

An intuitive overview of an approximate nearest neighbor query algorithm, illustrated in FIGS. 1(a)-(b), is as follows. Given the query point q, begin by locating the leaf cell containing the query point in O(log n) time by a simple descent through the tree. Next, begin enumerating the leaf cells in increasing order of distance from the query point. When a cell is visited, the distance from q to the point associated with this cell is computed. One needs to keep track of the closest point seen so far. For example, FIG. 1(a) shows the cells of such a subdivision. Each cell has been numbered 1 to 9 according to its distance from the query point. Let p denote the closest point seen so far. As soon as the distance from q to the current leaf cell exceeds dist(q, p)/(1+ε), illustrated by the dotted circle in FIG. 1(a), it follows that the search can be terminated, and p can be reported as an approximate nearest neighbor to q. The reason is that any point located in a subsequently visited cell cannot be close enough to q to violate p's claim to be an approximate nearest neighbor. In the example shown in the figure, the search terminates just prior to visiting cell 9. In this case p is not the true nearest neighbor, since that point belongs to cell 9, which was never visited.

The number of cells visited in the search depends on d and E, but not on n. To see this, consider the last leaf cell to be visited that did not cause the algorithm to terminate. If r denotes the distance from q to this cell, and p denotes the closest data point encountered so far, then because the procedure does not terminate, it is known that the distance from q to p is at least r(1+ε), as indicated in FIG. 1(b). One could not have seen a leaf cell of diameter less than rε up to now, since the associated data point would necessarily be closer to q than p. This provides a lower bound on the sizes of the leaf cells seen. The boundedness of the cells and a simple packing argument provide an upper bound on the number of cells encountered.

Figure 2:
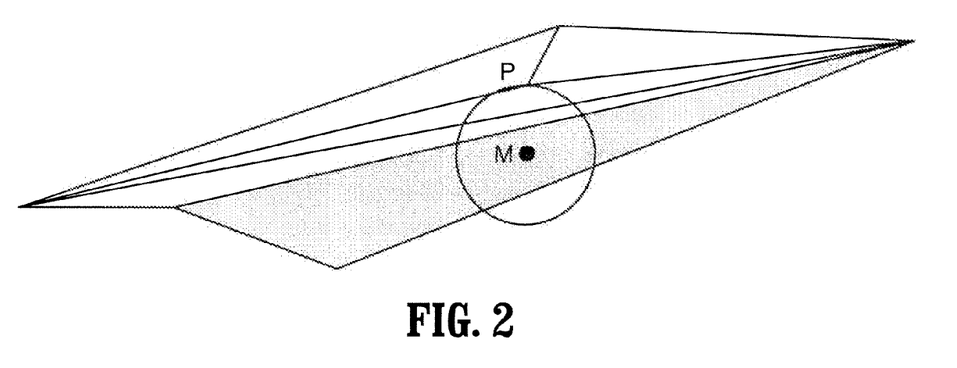
FIG. 2 illustrates a special case in determining whether a point is inside or outside a TVM, according to an embodiment of the invention.

The adaptation of the Nearest Point Algorithm according to an embodiment of the invention is not straightforward as special cases may occur, such as that illustrated in FIG. 2, which shows an extension in 2D. Referring to the figure, the point M is not in any triangle around the point P, the nearest point in the TVM, although point M is in the TVM. This type of situation can occur when there are lengthened or extreme-shaped tetrahedra.

Figure 4:
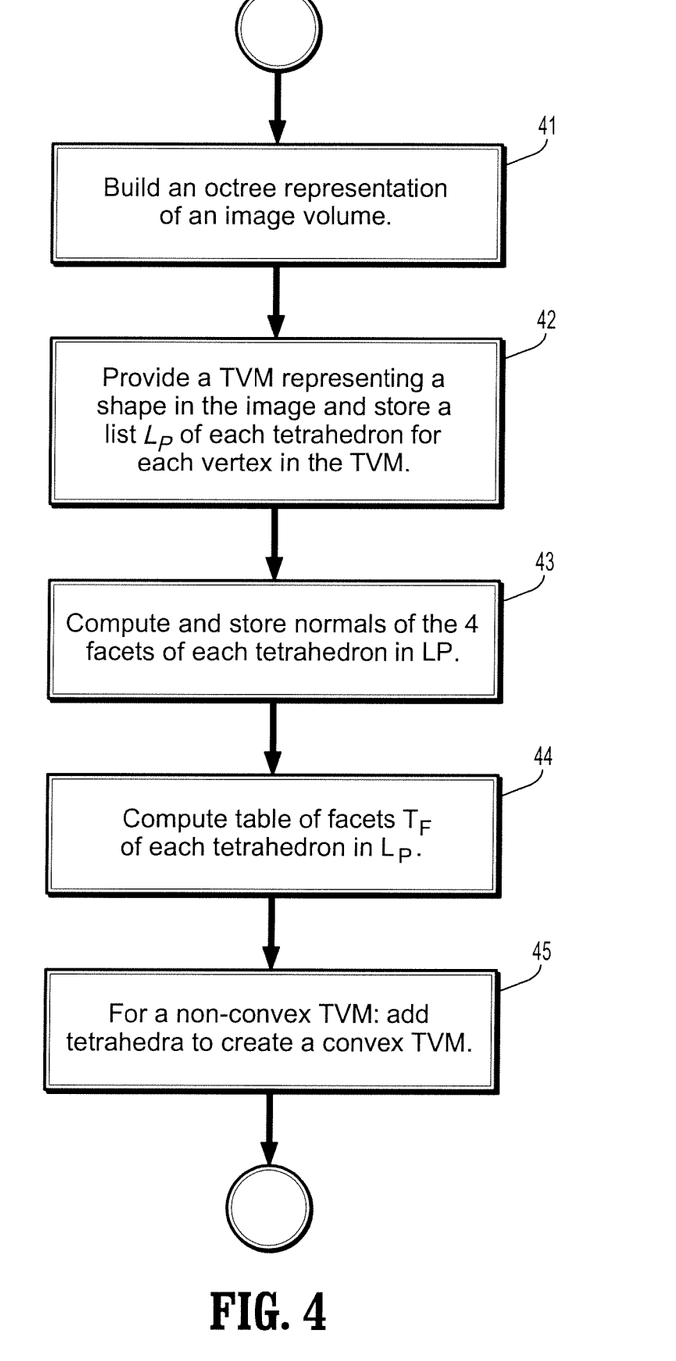
FIG. 4 is a flowchart of some precomputations, according to an embodiment of the invention.

A flowchart of a method of some precomputations is shown in FIG. 4. Referring now to the figure, at step 41, given an image volume to be represented, an octree $O_{TVM}$ is built to improve the searching of nearest points to the vertices of a TVM. Next, given a TVM in the image, some pre-computations are performed on the TVM. At step 42, a list $L_P$ of tetrahedra is stored for each vertex P of the TVM. At step 43, the normals $\overline{N}_A^{ABCD}$, $\overline{N}_B^{ABCD}$, $\overline{N}_C^{ABCD}$, and $\overline{N}_D^{ABCD}$ of the 4 facets of each tetrahedron in $L_P$ are computed and stored. At step 54, a table $T_F$ of corresponding facets is computed. These are facets with normal vectors of opposite directions. Then, at step 45, which is optional, if the TVM is non-convex, a convex TVM may be precomputed by adding several tetrahedra, to create a convex volume. The added tetrahedra are labeled as "outside" the TVM, to distinguish them from the tetrahedra of the original TVM, which are labeled as "inside" tetrahedra. A method according to an embodiment of the invention for adding tetrahedra to create a convex volume is disclosed below in connection with FIG. 6.

Figure 5:
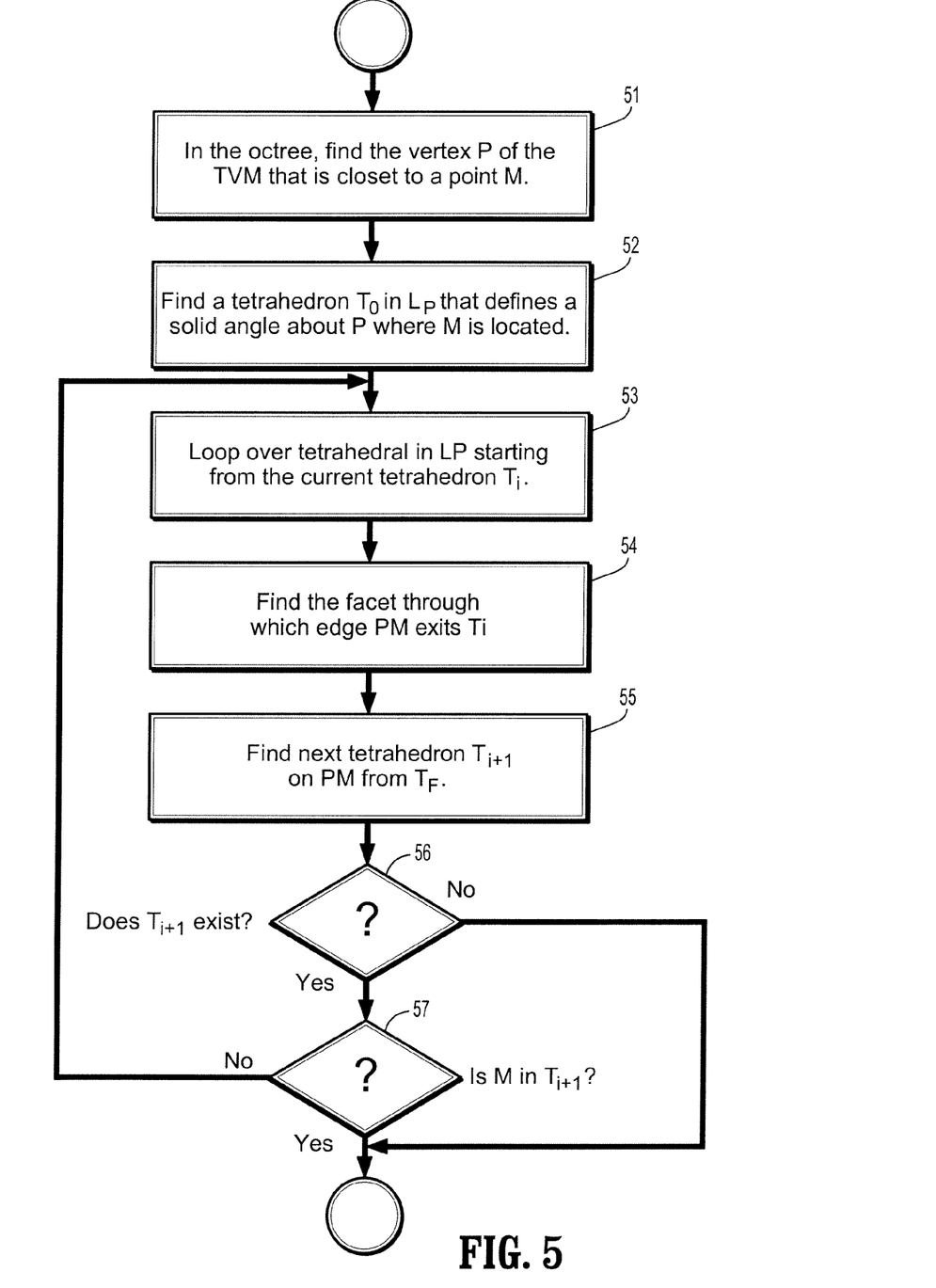
FIG. 5 is a flowchart of a method for point localization in and out of a tetrahedral mesh, according to an embodiment of the invention.

After the pre-computations are complete, given a point M, one can then determine if point M belongs to a TVM. FIG. 5 is a flowchart of a method for determining if a point M belongs to a TVM, according to an embodiment of the invention. Referring now to the figure, at step 51, given point M, one examines the octree $O_{TVM}$ to find the closest vertex P of the TVM to point M using a nearest point algorithm such as that described above. At step 52, one seeks a tetrahedron $T_0$ in the tetrahedral list $L_P$, which defines a solid angle around P in which M is located. For a tetrahedron T=ABCP, this condition can be checked by evaluating the following relationships:

$$\overline{PM} \cdot \overline{N}_A^{ABCD} \geq 0,$$

$$\overline{PM} \cdot \overline{N}_B^{ABCD} \geq 0,$$

$$\overline{PM} \cdot \overline{N}_C^{ABCD} \geq 0. \quad (1)$$

Figure 3:
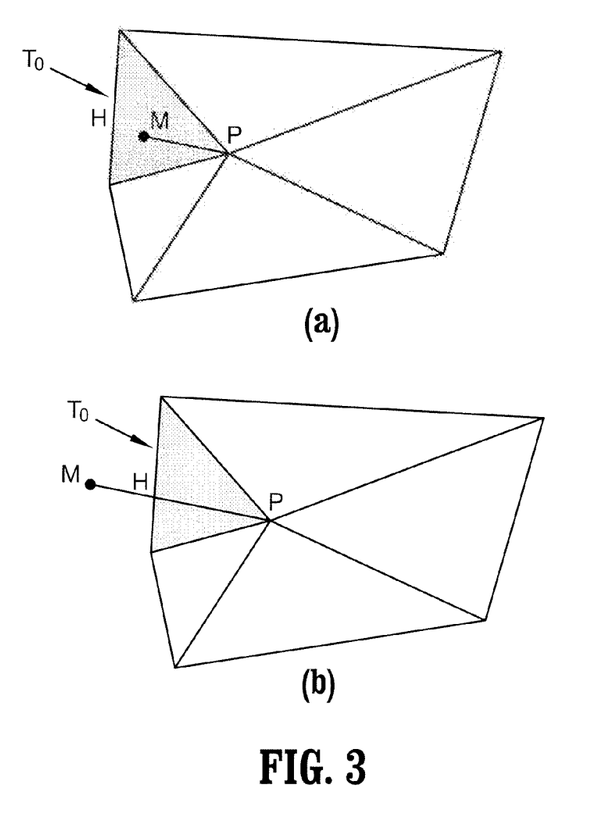
FIGS. 3(a)-(b) illustrate two situations that can occur when finding a tetrahedron containing a line segment, according to an embodiment of the invention.

As the normal vector of each facet of the tetrahedron is precomputed, these inequalities are easily evaluated. There are 3 possibilities for $T_0$: (1) No tetrahedron satisfies these inequalities, i.e. $T_0$ does not exist, and M is outside the TVM; (2) There exits a tetrahedron satisfying the inequalities such that M is inside $T_0$, which means that M is inside TVM if $T_0$ is an inside tetrahedron and $T_0$ is the tetrahedron which contains M; and (3) There exits a tetrahedron satisfying the inequalities such that M is inside the TVM, but is not in $T_0$. For the first 2 cases, the algorithm is complete, as an answer has been provided as to whether M is inside the TVM. For the third case, the algorithm proceeds to step 53. FIGS. 3($a$)-($b$) illustrate two of these possibilities that occur when finding $T_0$ along PM in a 2D projection. FIG. 3($a$) illustrates the situation in which M is inside $T_0$, while FIG. 3($b$) illustrates the situation in which M is outside $T_0$.

The next step, step 53, is to find a tetrahedron along the edge PM. To do this, let the current tetrahedron be $T_i$, with $T_0$ being the first tetrahedron to consider, and define the current facet $F_i$ as the facet trough which PM exits $T_i$. To find this tetrahedron, the following steps 54-56 are repeated to search for tetrahedra in $L_P$ crossed by the edge PM. The first, step 54, is to find the facet $F_i$ through which PM exits $T_i$. Since it is known by which facet the line segment PM enters the tetrahedron, PM must exit by one of the other three. For i=0, $F_0$=ABC, and $H_0$ is the point in $F_0$ through which PM exits. For the case of i>0, one computes the intersection of PM with the plane of each facet and then checks if the intersection is inside the triangle corresponding to the facet using inequalities (1). Only one of these inequalities should be true. The computation includes several steps. First, compute a point $H_i$ that is an intersection of the line segment PM and the planes of each of the facets of $T_i$=($A_i$, $B_i$, $C_i$, $D_i$) with ($A_i$, $B_i$, $C_i$) as an entering face of PM:

$$\overline{OH_i^{B_iC_iD_i}} = \overline{OP} + \frac{\overline{N_{A_i}^{A_iB_iC_iD_i}} \cdot \overline{PA_i}}{\overline{N_{A_i}^{A_iB_iC_iD_i}} \cdot \overline{PM}} \overline{PM}, \quad (2)$$

$$\overline{OH_i^{A_iB_iD_i}} = \overline{OP} + \frac{\overline{N_{B_i}^{A_iB_iC_iD_i}} \cdot \overline{PB_i}}{\overline{N_{B_i}^{A_iB_iC_iD_i}} \cdot \overline{PM}} \overline{PM},$$

$$\overline{OH_i^{A_iB_iC_i}} = \overline{OP} + \frac{\overline{N_{C_i}^{A_iB_iC_iD_i}} \cdot \overline{PC_i}}{\overline{N_{C_i}^{A_iB_iC_iD_i}} \cdot \overline{PM}} \overline{PM}.$$

Here, point O is the origin of the coordinate system. Note that the point of intersection H of line PM with the plane of a facet may not lie within the triangle corresponding to the facet itself. Thus, the next step is to determine which intersection point $H_i^{B_iC_iD_i}$, $H_i^{A_iB_iD_i}$, or $H_i^{A_iB_iC_i}$ lies within the triangle of a facet:

if $\overline{H_{i-1}H_i^{B_iC_iD_i}} \cdot N_{B_i}^{A_iB_iC_iD_i} \geq 0$ and $\overline{H_{i-1}H_i^{B_iC_iD_i}} \cdot N_{C_i}^{A_iB_iC_iD_i} \geq 0$ then $H_i = H_i^{B_iC_iD_i}$;

if $\overline{H_{i-1}H_i^{A_iC_iD_i}} \cdot N_{A_i}^{A_iB_iC_iD_i} \geq 0$ and $\overline{H_{i-1}H_i^{B_iC_iD_i}} \cdot N_{C_i}^{A_iB_iC_iD_i} \geq 0$ then $H_i = H_i^{A_iC_iD_i}$;

if $\overline{H_{i-1}H_i^{A_iB_iD_i}} \cdot N_{A_i}^{A_iB_iC_iD_i} \geq 0$ and $\overline{H_{i-1}H_i^{B_iC_iD_i}} \cdot N_{B_i}^{A_iB_iC_iD_i} \geq 0$ then $H_i = H_i^{A_iB_iD_i}$;

Point H is shown in each of FIGS. 3($a$)-($b$) where PM exits $T_0$, which is the shaded tetrahedron. At step 55 the next tetrahedron $T_{i+1}$ on PM can be found using the table of corresponding facets, $T_F$, computed above in the pre-computation steps. At step 56, if $T_{i+1}$ exists, the procedure advances to step 57, while if $T_{i+1}$ does not exist, then M is outside the TVM, and the procedure exits. At step 57, one tests whether or not M is in $T_{i+1}$ using EQ. (1). If true, M is inside the TVM if $T_{i+1}$ is labeled as not outside of the TVM and $T_{i+1}$ is the tetrahedron which contains M, and the procedure exits. If false, the procedure returns to step 53 and advances to the next tetrahedron in $L_P$ along PM.

Figure 6:
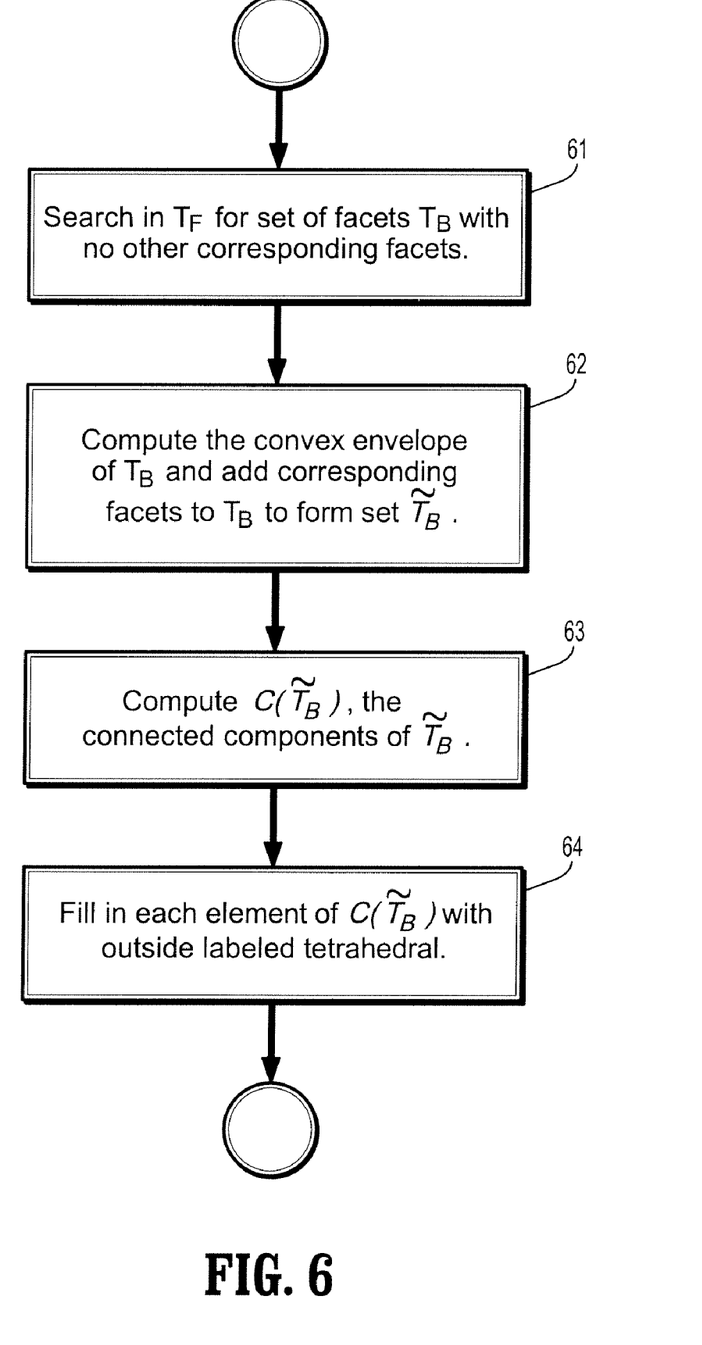
FIG. 6 is a flowchart of a method for converting a TVM into a convex volume, according to an embodiment of the invention.

If the TVM is not a convex volume, then the TVM should be converted into a convex volume by adding outer tetrahedral, as described above in connection with step 45 of FIG. 4. FIG. 6 is a flowchart of a method for converting a TVM into a convex volume, according to an embodiment of the invention. Referring to the figure, these outer tetrahedra can be computed as follows. At step 61, one searches in the facet table $T_F$ for those facets with no other corresponding facets, such as facets on the volume borders: call this set of facets $T_B$. At step 62, the convex envelope of $T_B$ is computed, and the corresponding facets are added to $T_B$, forming a set $\tilde{T}_B$. At step 63, the connected components $C(\tilde{T}_B)$ of $\tilde{T}_B$ are computed. Then, at step 64, each element of $C(\tilde{T}_B)$, which is a set of facets, is filled in with tetrahedra labeled as outside tetrahedra. The result of this pre-computation is a new convex TVM with 2 types of tetrahedral, labeled as inner or outer.

Pre-computation decreases the dependence of computation time on the number of points and tetrahedra in the TVM. However, it is desirable to optimize the storage of pre-computed data in order not to consume unnecessary disk space. The limitation factor on computation time for this method is the mean number of edges per vertex.

If an algorithm according to an embodiment of the invention is used on a set of points representing the positions of a continuously moving object, one can accelerate the process by applying the test of EQ. (1) to the previously determined tetrahedron.

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 7:
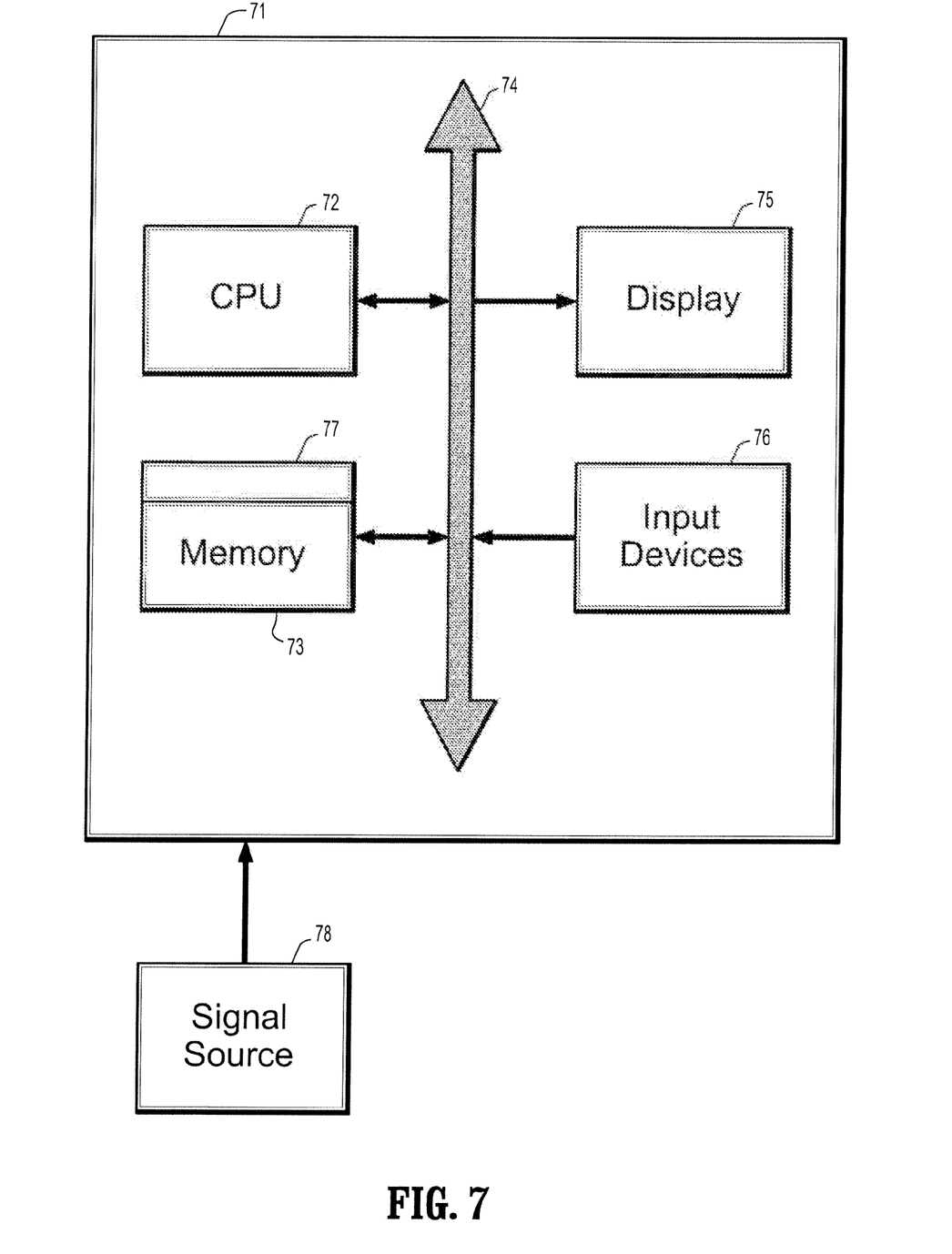
FIG. 7 is a block diagram of an exemplary computer system for implementing a method for point localization in and out of a tetrahedral mesh, according to an embodiment of the invention.

FIG. 7 is a block diagram of an exemplary computer system for implementing a method for point localization in and out of a tetrahedral mesh, according to an embodiment of the invention. Referring now to FIG. 7, a computer system 71 for implementing the present invention can comprise, inter alia, a central processing unit (CPU) 72, a memory 73 and an input/output (I/O) interface 74. The computer system 71 is generally coupled through the I/O interface 74 to a display 75 and various input devices 76 such as a mouse and a keyboard. The support circuits can include circuits such as cache, power supplies, clock circuits, and a communication bus. The memory 73 can include random access memory (RAM), read only memory (ROM), disk drive, tape drive, etc., or a combinations thereof. The present invention can be implemented as a routine 77 that is stored in memory 73 and executed by the CPU 72 to process the signal from the signal source 78. As such, the computer system 71 is a general purpose computer system that becomes a specific purpose computer system when executing the routine 77 of the present invention.

The computer system 71 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method for determining whether a point is contained in a sub-volume of a digitized medical image, comprising the steps of:
   providing a digitized image volume, said image volume comprising a plurality of intensities associated with a 3-dimensional grid of voxels;
   representing a sub-volume of said image with a tetrahedron volume mesh (TVM);
   providing a point M in said image;
   finding a vertex P of said TVM that is closest to point M; and
   determining whether there exists a tetrahedron T in said TVM that defines a solid angle around point P where point M is located, wherein if no such tetrahedron T exists, then point M is outside said TVM, and wherein if T exists and M is inside T, then M is inside said TVM.

2. The method of claim 1, wherein if tetrahedron T exists and M is not inside T, further comprising the steps of:
   finding a facet F of tetrahedron T through which a line PM connecting points M and P exits T;
   determining whether a next tetrahedron $T_{i+1}$ of said TVM exists along line PM, wherein if no such tetrahedron $T_{i+1}$ exists, then point M is outside said TVM, and wherein if $T_{i+1}$ exists, determining whether point M is inside tetrahedron $T_{i+1}$.

3. The method of claim 2, wherein if point M is inside tetrahedron $T_{i+1}$, then point M is inside said TVM, and if point M is not inside tetrahedron $T_{i+1}$, repeating said steps of finding a facet F of tetrahedron $T_{i+1}$ through which a line PM exits $T_{i+1}$ and determining whether another tetrahedron of said TVM exists along line PM.

4. The method of claim 2, wherein determining whether point M is inside tetrahedron $T_{i+1}$, wherein tetrahedron $T_{i+1}$ has vertices A, B, C, D, comprises testing whether the inequalities $$(\overline{BM} \cdot \overline{N}_A^{ABCD}) \cdot (\overline{BA} \cdot \overline{N}_A^{ABCD}) \geq 0,$$

$$(\overline{CM} \cdot \overline{N}_B^{ABCD}) \cdot (\overline{CB} \cdot \overline{N}_B^{ABCD}) \geq 0,$$

$$(\overline{DM} \cdot \overline{N}_C^{ABCD}) \cdot (\overline{DC} \cdot \overline{N}_C^{ABCD}) \geq 0,$$

$$(\overline{AM} \cdot \overline{N}_D^{ABCD}) \cdot (\overline{AD} \cdot \overline{N}_D^{ABCD}) \geq 0,$$

hold true, wherein $\overline{N}_A^{ABCD}$, $\overline{N}_B^{ABCD}$, $\overline{N}_C^{ABCD}$, and $\overline{N}_D^{ABCD}$ are the normal vectors to the four facets of ABCD, and the subscript corresponds to the opposite vertex of the facet.

5. The method of claim 2, wherein finding a facet F of tetrahedron T wherein tetrahedron T has vertices A, B, C, P, through which line PM exits T comprises, for a first tetrahedron along line PM, finding facet ABC and the point $H_0$ in ABC through which line PM exits, and for a subsequent tetrahedron $T_i$ along line PM, finding the points of intersection of line PM with the planes containing each of the other facets of tetrahedron T and determining which intersection point is contained within the triangle of a facet of tetrahedron T.

6. The method of claim 5, wherein finding the points of intersection of line PM with the planes containing each of the other facets of tetrahedron T comprises calculating $$\overline{OH}_i^{B_iC_iD_i} = \overline{OP} + \frac{\overline{N}_{A_i}^{A_iB_iC_iD_i} \cdot \overline{PA_i}}{\overline{N}_{A_i}^{A_iB_iC_iD_i} \cdot \overline{PM}} \overline{PM},$$

$$\overline{OH}_i^{A_iB_iD_i} = \overline{OP} + \frac{\overline{N}_{B_i}^{A_iB_iC_iD_i} \cdot \overline{PB_i}}{\overline{N}_{B_i}^{A_iB_iC_iD_i} \cdot \overline{PM}} \overline{PM},$$

$$\overline{OH}_i^{A_iB_iC_i} = \overline{OP} + \frac{\overline{N}_{C_i}^{A_iB_iC_iD_i} \cdot \overline{PC_i}}{\overline{N}_{C_i}^{A_iB_iC_iD_i} \cdot \overline{PM}} \overline{PM}.$$

wherein point O is the origin of the coordinate system, $\overline{N}_A^{ABCD}$, $\overline{N}_B^{ABCD}$, $\overline{N}_C^{ABCD}$, and $\overline{N}_D^{ABCD}$ are the normal vectors to the four facets of ABCD and the subscript corresponds to the opposite vertex of the facet, and $H_i^{B_iC_iD_i}$, $H_i^{A_iB_iC_i}$, $H_i^{A_iB_iD_i}$, are the points of intersection with the planes of facets $B_iC_iD_i$, $A_iB_iC_i$, and $A_iB_iD_i$ of tetrahedron $T_i$.

7. The method of claim 6, wherein if $\overline{H_{i-1}H_i^{B_iC_iD_i}} \cdot \overline{N}_{B_i}^{A_iB_iC_iD_i} \geq 0$ and $\overline{H_{i-1}H_i^{B_iC_iD_i}} \cdot \overline{N}_{C_i}^{A_iB_iC_iD_i} \geq 0$ then $H_i = H_i^{B_iC_iD_i}$, if $\overline{H_{i-1}H_i^{A_iC_iD_i}} \cdot \overline{N}_{A_i}^{A_iB_iC_iD_i} \geq 0$ and $\overline{H_{i-1}H_i^{B_iC_iD_i}} \cdot \overline{N}_{C_i}^{A_iB_iC_iD_i} \geq 0$ then $H_i = H_i^{A_iC_iD_i}$, or if $\overline{H_{i-1}H_i^{A_iB_iD_i}} \cdot \overline{N}_{A_i}^{A_iB_iC_iD_i} \geq 0$ and $\overline{H_{i-1}H_i^{B_iC_iD_i}} \cdot \overline{N}_{B_i}^{A_iB_iC_iD_i} \geq 0$ then $H_i = H_i^{A_iB_iD_i}$, wherein $H_{i-1}$ is the intersection point of a previous tetrahedron along line PM.

8. The method of claim 1, further comprising computing an octree to represent said digital image volume, wherein said vertex P of said TVM that is closest to point M is found by using a nearest point algorithm on said octree.

9. The method of claim 2, further comprising:
   computing a list $L_P$ of all tetrahedra of said TVM;
   computing and storing normal vectors of each of the four facets of each tetrahedron in said list; and
   computing a table of facets $T_F$ corresponding to each normal vector;
   searching said list $L_P$ to find said tetrahedron T in said TVM that defines a solid angle around point P in which point M is located; and
   searching said facet table $T_F$ to find said next tetrahedron $T_{i+1}$ of said TVM along line PM.

10. The method of claim 9, further comprising, for a TVM that is not convex, searching said facet table $T_F$ to find facets $T_B$ with no other corresponding facets, computing a convex envelope of the facets $T_B$ and adding facets $\tilde{T}_B$ corresponding to said envelope to said facets $T_B$, computing connected components $C(\tilde{T}_B)$ in $\tilde{T}_B$, and filling each connected component of $C(\tilde{T}_B)$ with a tetrahedron labeled as an outside tetrahedron, wherein tetrahedra of said non-convex TVM are labeled as inside tetrahedra, wherein said TVM is converted to a convex sub-volume.

11. The method of claim 10, wherein point M is inside said TVM if said tetrahedron T is an inside tetrahedron.

12. A method for determining whether a point is contained in a sub-volume of a digitized medical image, comprising the steps of:

providing a tetrahedron volume mesh (TVM) representing a sub-volume of a digital image volume, and a point M;
finding a vertex P of said TVM that is closest to point M;
finding a tetrahedron $T_i$ in said TVM that defines a solid angle around point P where point M is located, wherein if M is inside $T_i$, then M is inside said TVM;
if M is not inside $T_i$, finding a facet F of tetrahedron $T_i$ through which a line PM connecting points M and P exits $T_i$; and
determining whether a next tetrahedron $T_{i+1}$ of said TVM exists along line PM, wherein if no such tetrahedron $T_{i+1}$ exists, then point M is outside said TVM, and wherein if $T_{i+1}$ exists, determining whether point M is inside tetrahedron $T_{i+1}$.

13. The method of claim 12, wherein if no such tetrahedron $T_i$ in said TVM exists that defines a solid angle around point P where point M is located, then point M is outside said TVM.

14. The method of claim 12, wherein if point M is inside tetrahedron $T_{i+1}$, then point M is inside said TVM, and if point M is not inside tetrahedron $T_{i+1}$, repeating said steps of finding a facet F of tetrahedron $T_{i+1}$ through which a line PM exits $T_{i+1}$ and determining whether another tetrahedron of said TVM exists along line PM.

15. The method of claim 12, wherein determining whether point M is inside tetrahedron $T_{i+1}$, wherein tetrahedron $T_{i+1}$ has vertices A, B, C, D, comprises testing whether the inequalities $$(\overline{BM}\cdot\overline{N}_A^{ABCD})\cdot(\overline{BA}\cdot\overline{N}_A^{ABCD})\geq 0,$$

$$(\overline{CM}\cdot\overline{N}_B^{ABCD})\cdot(\overline{CB}\cdot\overline{N}_B^{ABCD})\geq 0,$$

$$(\overline{DM}\cdot\overline{N}_C^{ABCD})\cdot(\overline{DC}\cdot\overline{N}_C^{ABCD})\geq 0,$$

$$(\overline{AM}\cdot\overline{N}_D^{ABCD})\cdot(\overline{AD}\cdot\overline{N}_D^{ABCD})\geq 0,$$

hold true, wherein $\overline{N_A^{ABCD}}$, $\overline{N_B^{ABCD}}$, $\overline{N_C^{ABCD}}$, and $\overline{N_D^{ABCD}}$ are the normal vectors to the four facets of ABCD, and the subscript corresponds to the opposite vertex of the facet.

16. The method of claim 12, wherein finding a facet F of tetrahedron T wherein tetrahedron T has vertices A, B, C, P, through which line PM exits T comprises, for a first tetrahedron along line PM, finding facet ABC and the point $H_0$ in ABC through which line PM exits, and for a subsequent tetrahedron $T_i$ along line PM, finding the points of intersection of line PM with the planes containing each of the other facets of tetrahedron T and determining which intersection point is contained within the triangle of a facet of tetrahedron T.

17. A non-transitory computer readable storage device, tangibly embodying a program of instructions executable by the computer to perform the method steps for determining whether a point is contained in a sub-volume of a digitized medical image, said method comprising the steps of: providing a digitized image volume, said image volume comprising a plurality of intensities associated with a 3-dimensional grid of voxels; representing a sub-volume of said image with a tetrahedron volume mesh (TVM); providing a point M in said image; finding a vertex P of said TVM that is closest to point M; and determining whether there exists a tetrahedron T in said TVM that defines a solid angle around point P where point M is located, wherein if no such tetrahedron T exists, then point M is outside said TVM, and wherein if T exists and M is inside T, then M is inside said TVM.

18. The computer readable program storage device of claim 17, wherein if tetrahedron T exists and M is not inside T, the method further comprises the steps of:

finding a facet F of tetrahedron T through which a line PM connecting points M and P exits T;
determining whether a next tetrahedron $T_{i+1}$ of said TVM exists along line PM, wherein if no such tetrahedron $T_{i+1}$ exists, then point M is outside said TVM, and wherein if $T_{i+1}$ exists, determining whether point M is inside tetrahedron $T_{i+1}$.

19. The computer readable program storage device of claim 18, wherein if point M is inside tetrahedron $T_{i+1}$, then point M is inside said TVM, and if point M is not inside tetrahedron $T_{i+1}$, repeating said steps of finding a facet F of tetrahedron $T_{i+1}$ through which a line PM exits $T_{i+1}$ and determining whether another tetrahedron of said TVM exists along line PM.

20. The computer readable program storage device of claim 18, wherein determining whether point M is inside tetrahedron $T_{i+1}$, wherein tetrahedron $T_{i+1}$ has vertices A, B, C, D, comprises testing whether the inequalities $$(\overline{BM}\cdot\overline{N}_A^{ABCD})\cdot(\overline{BA}\cdot\overline{N}_A^{ABCD})\geq 0,$$

$$(\overline{CM}\cdot\overline{N}_B^{ABCD})\cdot(\overline{CB}\cdot\overline{N}_B^{ABCD})\geq 0,$$

$$(\overline{DM}\cdot\overline{N}_C^{ABCD})\cdot(\overline{DC}\cdot\overline{N}_C^{ABCD})\geq 0,$$

$$(\overline{AM}\cdot\overline{N}_D^{ABCD})\cdot(\overline{AD}\cdot\overline{N}_D^{ABCD})\geq 0,$$

hold true, wherein $\overline{N_A^{ABCD}}$, $\overline{N_B^{ABCD}}$, $\overline{N_C^{ABCD}}$, and $\overline{N_D^{ABCD}}$ are the normal vectors to the four facets of ABCD, and the subscript corresponds to the opposite vertex of the facet.

21. The computer readable program storage device of claim 18, wherein finding a facet F of tetrahedron T wherein tetrahedron T has vertices A, B, C, P, through which line PM exits T comprises, for a first tetrahedron along line PM, finding facet ABC and the point $H_0$ in ABC through which line PM exits, and for a subsequent tetrahedron $T_i$ along line PM, finding the points of intersection of line PM with the planes containing each of the other facets of tetrahedron T and determining which intersection point is contained within the triangle of a facet of tetrahedron T.

22. The computer readable program storage device of claim 21, wherein finding the points of intersection of line PM with the planes containing each of the other facets of tetrahedron T comprises calculating $$\overline{OH_i^{B_iC_iD_i}} = \overline{OP} + \frac{\overline{N_{A_i}^{A_iB_iC_iD_i}} \cdot \overline{PA_i}}{\overline{N_{A_i}^{A_iB_iC_iD_i}} \cdot \overline{PM}}\overline{PM},$$

$$\overline{OH_i^{A_iB_iD_i}} = \overline{OP} + \frac{\overline{N_{B_i}^{A_iB_iC_iD_i}} \cdot \overline{PB_i}}{\overline{N_{B_i}^{A_iB_iC_iD_i}} \cdot \overline{PM}}\overline{PM},$$

$$\overline{OH_i^{A_iB_iC_i}} = \overline{OP} + \frac{\overline{N_{C_i}^{A_iB_iC_iD_i}} \cdot \overline{PC_i}}{\overline{N_{C_i}^{A_iB_iC_iD_i}} \cdot \overline{PM}}\overline{PM}.$$

wherein point O is the origin of the coordinate system, $\overline{N_A^{ABCD}}$, $\overline{N_B^{ABCD}}$, $\overline{N_C^{ABCD}}$, and $\overline{N_D^{ABCD}}$ are the normal vectors to the four facets of ABCD and the subscript corresponds to the opposite vertex of the facet, and $H_i^{B_iC_iD_i}$, $H_i^{A_iB_iC_i}$, $H_i^{A_iB_iD_i}$ are the points of intersection with the planes of facets $B_iC_iD_i$, $A_iB_iC_i$, and $A_iB_iD_i$ of tetrahedron $T_i$.

23. The computer readable program storage device of claim 22, wherein if $\overline{H_{i-1}H_i^{B_iC_iD_i}}\cdot\overline{N_{B_i}^{A_iB_iC_iD_i}}\geq 0$ and $\overline{H_{i-1}H_i^{B_iC_iD_i}}\cdot\overline{N_{C_i}^{A_iB_iC_iD_i}}\geq 0$ then $H_i=H_i^{B_iC_iD_i}$, if $\overline{H_{i-1}H_i^{A_iC_iD_i}}\cdot\overline{N_{A_i}^{A_iB_iC_iD_i}}\geq 0$ and $\overline{H_{i-1}H_i^{B_iC_iD_i}}\cdot\overline{N_{C_i}^{A_iB_iC_iD_i}}\geq 0$ then $H_i=H_i^{A_iC_iD_i}$, or if $\overline{H_{i-1}H_i^{A_iB_iD_i}} \cdot \overline{N_{A_i}^{A_iB_iC_iD_i}} \geq 0$ and $\overline{H_{i-1}H_i^{B_iC_iD_i}} \cdot \overline{N_{B_i}^{A_iB_iC_iD_i}} \geq 0$ then $H_i = H_i^{A_iB_iD_i}$, wherein $H_{i-1}$ is the intersection point of a previous tetrahedron along line PM.

24. The computer readable program storage device of claim 17, the method further comprising computing an octree to represent said digital image volume, wherein said vertex P of said TVM that is closest to point M is found by using a nearest point algorithm on said octree.

25. The computer readable program storage device of claim 18, the method further comprising:
computing a list $L_P$ of all tetrahedra of said TVM;
computing and storing normal vectors of each of the four facets of each tetrahedron in said list; and
computing a table of facets $T_F$ corresponding to each normal vector;
searching said list $L_P$ to find said tetrahedron T in said TVM that defines a solid angle around point P in which point M is located; and
searching said facet table $T_F$ to find said next tetrahedron $T_{i+1}$ of said TVM along line PM.

26. The computer readable program storage device of claim 25, the method further comprising, for a TVM that is not convex, searching said facet table $T_F$ to find facets $T_B$ with no other corresponding facets, computing a convex envelope of the facets $T_B$ and adding facets $\hat{T}_B$ corresponding to said envelope to said facets $T_B$, computing connected components $C(\hat{T}_B)$ in $\hat{T}_B$, and filling each connected component of $C(\hat{T}_B)$ with a tetrahedron labeled as an outside tetrahedron, wherein tetrahedra of said non-convex TVM are labeled as inside tetrahedra, wherein said TVM is converted to a convex subvolume.

27. The computer readable program storage device of claim 26, wherein point M is inside said TVM if said tetrahedron T is an inside tetrahedron.

\* \* \* \* \*